(12) United States Patent
Yuan

(10) Patent No.: US 12,314,147 B2
(45) Date of Patent: May 27, 2025

(54) HARD DISK PLUGGABLE METHOD AND SYSTEM, AND SERVER

(71) Applicant: Fulian Precision Electronics (Tianjin) Co., LTD., Tianjin (CN)

(72) Inventor: Jie Yuan, Tianjin (CN)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 93 days.

(21) Appl. No.: 18/380,885

(22) Filed: Oct. 17, 2023

(65) Prior Publication Data

US 2025/0068528 A1 Feb. 27, 2025

(30) Foreign Application Priority Data

Aug. 21, 2023 (CN) .......................... 202311055414.X

(51) Int. Cl.
  *G06F 11/22* (2006.01)
  *G06F 3/06* (2006.01)
  *G06F 11/27* (2006.01)

(52) U.S. Cl.
  CPC ........ *G06F 11/2221* (2013.01); *G06F 3/0607* (2013.01); *G06F 3/0643* (2013.01); *G06F 3/0689* (2013.01); *G06F 11/27* (2013.01)

(58) Field of Classification Search
  CPC ....... G06F 11/2221; G06F 11/26; G06F 11/27
  See application file for complete search history.

(56) References Cited

FOREIGN PATENT DOCUMENTS

| CN | 112667452 A | * | 4/2021 | |
|---|---|---|---|---|
| CN | 114780317 A | * | 7/2022 | |
| CN | 115129523 A | * | 9/2022 | .......... G06F 11/2221 |
| CN | 115292104 A | * | 11/2022 | |
| CN | 115543708 A | * | 12/2022 | |
| CN | 117033096 A | * | 11/2023 | |

* cited by examiner

*Primary Examiner* — Yolanda L Wilson
(74) *Attorney, Agent, or Firm* — ScienBiziP, P.C.

(57) ABSTRACT

Disclosed in the present invention are a hard disk pluggable method, a hard disk pluggable system, and a server. The hard disk pluggable includes determining whether the hard disk rack is in a first preset state and the hard disk rack is in a second preset state; controlling the execution unit to perform a second hot plug operation on the first hard disks of the hard disk rack and a second plug operation on the second hard disks of the spare hard disk rack based on the first record file and the second record file to restore the hard disk rack to the first preset state and the spare hard disk rack to the second preset state if the hard disk rack is not in the first preset state and/or the spare hard disk rack is not in the second preset state.

20 Claims, 5 Drawing Sheets

First record file

IN(num)=a

OUT(num)=b

OUT(num)HALF=b

FIG. 3

Second record file

IN(num)=a

OUT(num)=b

FIG. 4

HARD DISK PLUGGABLE METHOD AND SYSTEM, AND SERVER

FIELD

The present disclosure relates to the technical field of computer technology, in particular to a hard disk pluggable method and system, and a server.

BACKGROUND

Before a server leaves the factory, the firmware of a storage controller in the server needs to be tested for functionality. When conducting functional testing on the storage controller, it is necessary to build test case based on the functional tests and perform hot plugging of the hard disk in the server based on the test case. Due to the need for multiple functional tests, each of which requires multiple hot-plugging operation to be performed manually. As a result, the completion of functional testing of the firmware of the storage controller is time-consuming and labor-intensive, and the involvement of human labor increases the error rate during the testing and reduces efficiency.

Therefore, improvement is desired.

BRIEF DESCRIPTION OF THE DRAWINGS

FIG. 3 is a schematic diagram of a first record file according to an embodiment of the present disclosure.

FIG. 4 is a schematic diagram of a second record file according to an embodiment of the present disclosure.

DETAILED DESCRIPTION

In order to make the technical solutions of the embodiments of the present disclosure clearer, the technical solutions in the embodiments of the present disclosure will be described clearly and completely in the following in conjunction with the accompanying drawings in the embodiments of the present disclosure, and it is obvious that the described embodiments are a part of the embodiments of the present disclosure and not all of the embodiments.

In the description of the present disclosure, the terms "first", "second" are only used to distinguish the purpose of the description and cannot be understood as indicating or implying relative importance, nor can they be understood as indicating or implying order.

In the description of embodiments of the present disclosure, the words "for example" are used to denote an example, illustration, or description, any embodiment described as "for example" in the embodiments of the present disclosure should not be construed as being preferred or advantageous over other embodiments.

The server includes a storage controller, and the storage controller is a conversion device between the hard disk and other access memory devices. Before a server leaves the factory, the firmware of the storage controller in the server needs to be tested for functionality. For example, verifying the redundancy characteristics of the storage controller and verifying the reconfiguration capabilities of the storage controller for failed hard disks. When conducting functional testing on the storage controller, it is often necessary to perform hot plugging of the hard disk in the server.

The process of functional testing is as follows: test cases are constructed in advance for different functional tests, and then the testers perform hot plug operation on the hard disk of the server according to the contents of the test cases. The completion of functional testing of the firmware of the storage controller is time-consuming and labor-intensive, and the involvement of human labor increases the error rate during testing and reduces efficiency.

The storage controller can be a Host Bus Adapter (HBA) or a Redundant Arrays of Independent Disks (RAID). When the storage controller is the RAID, if the tester does not know enough about the attribute characteristics of the RAID, it will increase the error rate of the functional test.

The present disclosure provides a hard disk pluggable method, a hard disk pluggable system, and a server to improve the efficiency of hot plug operation for the hard disks.

Embodiments of the present disclosure are further described below in conjunction with the accompanying drawings.

Figure 1:
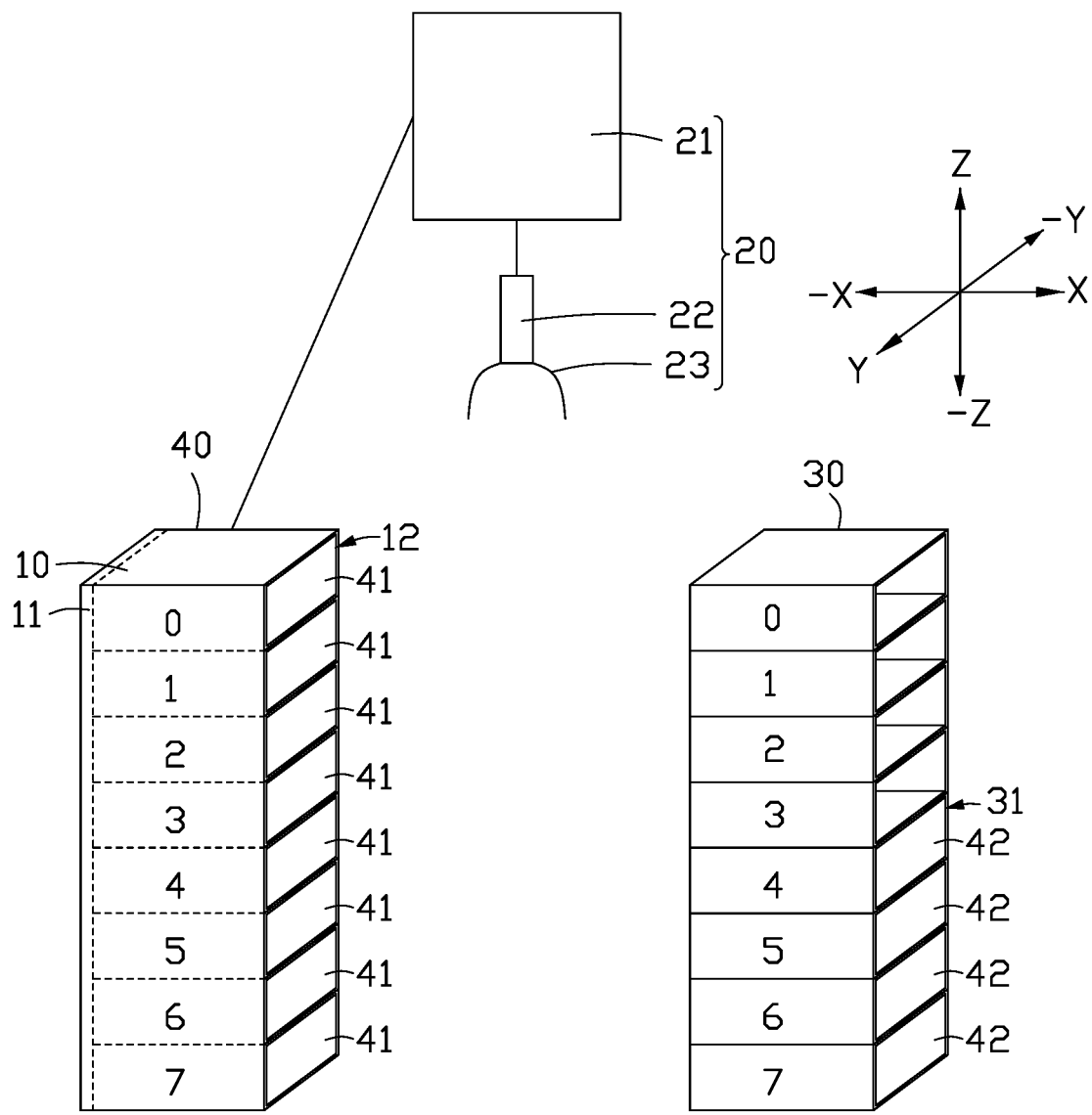
FIG. 1 is a schematic diagram of a hard disk pluggable system according to an embodiment of the present disclosure.

FIG. 1 illustrates a hard disk pluggable system 100 in accordance with an embodiment of the present disclosure.

As shown in FIG. 1, the hard disk pluggable system 100 includes a server 10, an execution unit 20 and a spare hard disk rack 30. The server 10 is electrically coupled to the execution unit 20. The server 10 includes a backplane 11 and a hard disk rack 40, the hard disk rack 40 defines a plurality of first slots 12, and each first slot 12 can accommodate a hard disk 41. When a hard disk 41 is inserted to a first slot 12, and the hard disk 41 can be connected to an interface (not shown in figures) of the backplane 11, and the hard disk 41 can communicated with the backplane 11. The spare hard disk rack 30 defines a plurality of second slots 31, each second slot 31 can accommodate a hard disk 42. The server 10 is used to execute the hard disk pluggable method to generate control instructions, the execution unit 20 is used to execute the control instructions of the server 10, perform the hot plug operation on the plurality of the hard disks 41 on the hard disk rack 40, and perform plug operation on the plurality of the hard disks 42 on the spare hard disk rack 30, to conduct multiple test case tests and complete functional testing of the firmware of the storage controller.

In some embodiments, the execution unit 20 includes a driving device 21, a mechanical arm 22, and a mechanical clamp 23. The driving device 21 is connected to the mechanical arm 22, and the mechanical arm 22 is connected to the mechanical clamp 23. The driving device 21 is used to disk the mechanical arm 22 to move in a first direction (as shown in a Z-axis direction in FIG. 1), in a second direction (as shown in a-Z-axis direction in FIG. 1), in a third direction (as shown in a X-axis direction in FIG. 1), in a fourth direction (as shown in a-X-axis direction in FIG. 1), in a fifth direction (as shown in a Y-axis direction in FIG. 1), and in a sixth direction (as shown in a-Y-axis direction in FIG. 1). The mechanical arm 22 is used to perform an extension action or a contraction action to move the mechanical clamp 23. The mechanical arm 22 may be a two degree of freedom robotic arm. The mechanical clamp 23 is used to grab or release the hard disk. The mechanical clamp 23 may be provided with one or more cylinders, and the gripping action or the releasing action is realized by the cylinders. The execution unit 20 accomplishes the hot plug operation on the server 10 or the plug operation on the spare hard disk rack 30 by means of the driving device 21, the mechanical arm 22 and the mechanical clamp 23. In one embodiment, the driving device 21 is an electric motor.

In one application scenario of the hard disk pluggable system 100 of FIG. 1, under the Linux operating system, the server 10 uses software tools such as scripts to create record files to execute the hard disk pluggable method. The server 10 creates a first record file and a second record file. When testing the test case for the redundancy characteristic, the server 10 uses the first record file to record a first hot plug operation performed by the execution unit 20 on the hard disk 41 of the hard disk rack 40, and the server 10 uses the second record file to record a first plug operation performed by the execution unit 20 on the hard disks 42 of the spare hard disk rack 30. The server 10 determines, based on the first record file, whether the first slots 12 of the hard disk rack 40 are plugged with the hard disks 41, i.e., whether the first slots 12 are in a first preset state, and the server 10 determines, based on the second record file, whether a preset number of the second slots 31 of the spare hard disk rack 30 are plugged with the hard disks 42, i.e., whether the spare hard disk rack 30 is in a second preset state. If there is a first slot 12 in of the hard disk rack 40 that does not plug with a hard disk 41 or the number of the second slots 31 of the hard disk rack 30 plugged with the hard disks 42 is less than the preset number, the execution unit 20 performs a second hot plug operation and a second plug operation on the hard disk based on the first record file and the second file, in order to restore the hard disk rack 40 to the first preset state and restore the spare hard disk rack 30 to the second preset state.

If the first slot 12 is in the first preset state and the spare hard disk rack 30 is in the second preset state, the execution unit 20 is controlled to perform a third hot plug operation and a third plug operation on the hard disk based on the test cases of the failed hard disk reconstruction, thereby improving the hot plug efficiency of the test cases that complete the failed hard disk reconstruction.

The server 10 may, in the process of testing a test case for the redundancy characteristic, utilize the execution unit 20 to unplug hard disks no larger than the maximum number of redundant disks from the member disks inserted in the server 10 to verify whether the logical volume composed of the remaining member disks can save data normally. The server 10 may also utilize the execution unit 20 to replace a hard disk in the member disk with a hard disk in the test case of testing the failed hard disk reconstruction function, and test whether the data of the replaced hard disk can be restored on the hard disk to verify the failed hard disk reconstruction function of the controller.

The hard disk pluggable method of the present disclosure can improve the efficiency of performing hot plug for one or more test cases, reduce the error rate of the hot plug operation, and accomplish the testing of the functionality of the storage controller.

Figure 2:
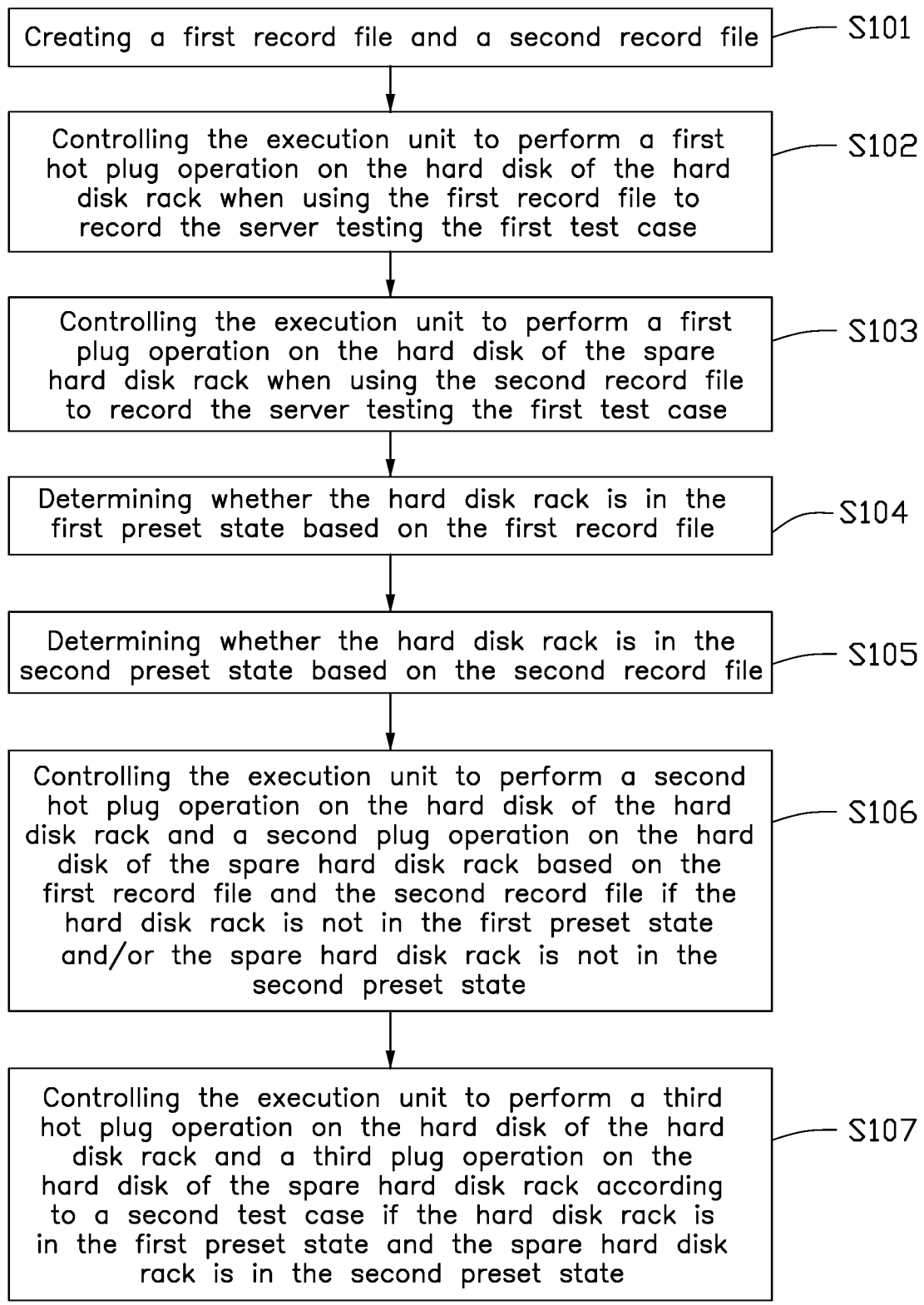
FIG. 2 is a flowchart of a hard disk pluggable method according to an embodiment of the present disclosure.

FIG. 2 is a flowchart depicting an embodiment of a hard disk pluggable method. In the embodiment, the hard disk pluggable method is applied to the server 10, and the hard disk pluggable method includes the following steps:

At step S101, creating a first record file and a second record file.

The server 10 creates the first record file and the second record file using software tools such as scripts for creating the record files under the Linux operating system.

At step S102, controlling the execution unit to perform a first hot plug operation on the hard disk of the hard disk rack when using the first record file to record the server testing the first test case.

At step S103, controlling the execution unit to perform a first plug operation on the hard disk of the spare hard disk rack when using the second record file to record the server testing the first test case.

When testing the first test case (the first test case is a test case for functionality testing of the storage controller), the server 10 generates the plurality of control instructions based on the test content of the first test case. After receiving the control instructions, the execution unit 20 performs the first hot plug operation on the hard disk 41 inserted in the first slot 12 on the hard disk rack 40 and the first plug operation on the hard disk 42 inserted in the second slot 31 on the spare hard disk rack 30, respectively, in accordance with the different control instructions, thereby completing the testing of the first test case. The first record file is used to record the first hot plug operation performed by the execution unit 20 on a hard disk 41 of the hard disk 41. The second record file is used to record the first plug operation performed by the execution unit 20 on a hard disk 42 of the spare hard disk rack 30.

At step S104, determining whether the hard disk rack is in the first preset state based on the first record file.

The record content of the first record file may include a hard disk identification of the hard disk for which the first hot plug operation has been performed, a subdivision action of the first hot plug operation corresponding to the hard disk identification, and a number of times of the first hot plug operation, etc. The first preset state is that the first slots 12 of the hard disk rack 40 are all plugged with the hard disks 41.

At step S105, determining whether the hard disk rack is in the second preset state based on the second record file.

The record content of the second record file may include a spare hard disk identification of the hard disk for which the first plug operation has been performed, a subdivision action of the first plug operation corresponding to the spare hard disk identification, and a number of times of the first plug operation, etc. The second preset state is that the spare hard disk rack 30 has a preset number of the second slots 31 for plugging with hard disks. The preset number can be set based on the test cases conducted during functional testing.

The server 10 stores the first preset state of the hard disk rack 40 and the second preset state of the spare hard disk rack 30. After testing the first test case, due to the first hot plug operation performed on the hard disk 41 of the hard disk rack 40 by the server 10, and the first hot plug operation performed on the hard disk 42 of the spare hard disk rack 30 by the server 10, therefore, some of the first slots 12 in the hard disk rack 40 may not be plugged into the hard disk, and the spare hard disk rack 30 may be less than the preset number of the second slots 31 plugged into the hard disk, meaning that the hard disk rack 40 may not be in the first preset state, and the spare hard disk rack 30 may not be in the second preset state. When testing the first test case, the first record file records the first hot plug operation performed by the execution unit 20 on the hard disk 41 of the hard disk rack 40, and the second record file records the first plug operation performed by the execution unit 20 on the hard disk of the spare hard disk rack 30. Therefore, after the first test case is tested, the server 10 can calculate whether the current hard disk rack 40 is still in the first preset state based on the first preset state and the first record file, and can also calculate whether the current spare hard disk rack 30 is still in the second preset state based on the second preset state and the second record file. The specific calculation method is not subject to specific limitations.

At step S106, controlling the execution unit to perform a second hot plug operation on the hard disk of the hard disk rack and a second plug operation on the hard disk of the spare hard disk rack based on the first record file and the second record file if the hard disk rack 40 is not in the first preset state and/or the spare hard disk rack is not in the second preset state, The hard disk rack 40 is restored to the first preset state and the spare hard disk rack 30 is restored to the second preset state.

The second hot plug operation is to restore the hard disk rack 40 to the first preset state, while the second plug operation is to restore the spare hard disk rack 30 to the second preset state.

After the server 10 determines that some first slots 12 do not plug in hard disks, and some second slots 31 that are greater than ½ do not plug in hard disks, the server 10 generates a recovery instruction based on the first record file and the second record file. After receiving the recovery instruction, the execution unit 20 performs a second hot plug operation on the hard disk 41 of the hard disk rack 40 and a second plug operation on the hard disk 42 of the spare hard disk rack 30, to restore the hard disk rack 40 to the first preset state and the spare hard disk rack 30 to the second preset state.

At step S107, controlling the execution unit to perform a third hot plug operation on the hard disk of the hard disk rack and a third plug operation on the hard disk of the spare hard disk rack according to a second test case if the hard disk rack is in the first preset state and the spare hard disk rack is in the second preset state.

The second test case refers to the next test case of the first test case. For example, when testing the functionality of a controller, the test case for redundancy characteristics is tested first, and then test the test case for the function of the failed hard disk reconstruction. The first test case is the test case for redundancy characteristics, and the second test case is the test case for the function of the failed hard disk reconstruction. The third hot plug operation refers to the hot plug operation performed by the execution unit 20 on the hard disk 41 of the hard disk rack 40 during the testing of the second test case. The third plug operation refers to the plug operation performed by the execution unit 20 on the hard disk 42 of the spare hard disk rack 30 during the testing of the second test case.

When the first slot 12 of the hard disk rack 40 is all plugged in with the hard disks 41, it indicates that the number of the hard disks in the server 10 meets the factory standard. When there are at least a preset number of the second slots 31 in the spare hard disk rack 30 to plug in with the hard disks 42, it indicates that the hard disk pluggable system 100 is ready to meet most test cases of the hard disk, and functional testing can begin on the storage controller of the server 10 that meets the factory standard number of hard disks. The execution unit 20 performs the third hot plug operation and the third plug operation required for the second test case, to assist the server in testing the second test case and improve the testing efficiency of the second test case.

There is no restriction on the execution sequence between steps S104 and S105, and there is no restriction on the execution sequence between steps S106 and S107.

In the above technical solution, the server 10 first creates a first record file and a second record file. When testing the first test case, the first record file is used to record the first hot plug operation performed by the execution unit 20 on the hard disk 41 of the hard disk rack 40, and the second record file is used to record the first plug operation performed by the execution unit 20 on the hard disk 42 of the spare hard disk rack 30. The server 10 determines whether the hard disk rack 40 is in the first preset state based on the first record file, and determines whether the spare hard disk rack 30 is in the second preset state based on the second record file.

If the hard disk rack 40 is not in the first preset state and/or the spare hard disk rack 30 is not in the second preset state, the server controls the execution unit 20 to perform the second hot plug operation on the hard disk 41 of the hard disk rack 40 and the second plug operation on the hard disk of the spare hard disk rack 30 according to the first record file and the second record file, in order to restore the hard disk rack 40 to the first preset state and the spare hard disk rack 30 to the second preset state, to prepare for the next test case.

If the hard disk rack 40 is in the first preset state and the spare hard disk rack 30 is in the second preset state, the server controls the execution unit 20 to perform the third hot plug operation on the hard disk 41 of the hard disk rack 40 and the third plug operation on the hard disk 42 of the spare hard disk rack 30 according to the second test case, to improve the hot plug efficiency of completing a test case. The above solution can improve the hot plug efficiency of one or more test cases during the functional detection of the storage controller and reduce the error rate of the hot plug operation.

In some embodiments, step S104 includes the following steps:

At step S201, determining whether the first record file has a hard disk identification.

As shown in FIG. 3, the record content of the first record file includes a hard disk identification <num> of the hard disk that has undergone the first hot plug operation.

At step S202, determining that the hard disk rack is in the first preset state if the first record file does not have a hard disk identification.

When the record content of the first record file does not record the hard disk identification <num>, it indicates that the execution unit 20 has not yet performed the first hot plug operation on any first slot 12 of the hard disk 41 on the hard disk rack 40, and the hard disk rack 40 is still in the first preset state.

At step S203, comparing a first hot unplug count record and a first hot insert count record of the hard disk corresponding to the hard disk identification if the first record file has a hard disk identification.

When the record content of the first record file has a hard disk identification <num>, it indicates that the execution unit 20 has performed the first hot plug operation on the hard disk in the slot 12 of the hard disk rack 40.

The first hot plug operation includes a first hot unplug operation, a first hot insertion operation, a first hot half unplug operation, a first hot half insertion operation, and a first hot transfer operation. The first hot unplug operation refers to the operation of completely unplugging the hard disk from the first slot 12. The first hot insertion operation refers to the operation of fully inserting the hard disk into the first slot 12. The first hot half unplug operation refers to the operation of unplugging the hard disk halfway out of the first slot 12. The first hot half insertion operation refers to the operation of inserting a hard disk located halfway through the first slot 12 into the first slot 12. The first hot transfer operation refers to removing the hard disk from one of the first slots 12 of the server 10 and inserting it into another first slot 12.

In one example, the server 10 generates five control instructions based on the test content of the first test case, namely IN:<num>NEW, IN:<num>, OUT:<num1>TO<num2>, OUT:<num>, and OUT:<num>BOX. After receiving the IN:<num>NEW instruction, the execution unit 20 performs the first hot insert operation on the hard disk with the hard disk identification num, after receiving the IN:<num> instruction, the execution unit 20 performs the first hot half insertion operation on the hard disk with the hard disk identification num, after receiving the OUT:<num>TO<num>instruction, the execution unit 20 performs the first hot transfer operation between the hard disk with the hard disk identification num1 and the hard disk with the hard disk identification num2, after receiving the OUT:<num> instruction, the execution unit 20 performs the first hot half unplug operation on the hard disk with the hard disk identification num, after receiving the OUT:<num>BOX instruction, the execution unit 20 performs the first hot unplug operation on the hard disk with the hard disk identification num.

The server 10 records on the first record file the subdivision actions of the execution unit 20 for the first hot plug operation of the hard disk corresponding to the hard disk identification and the number of times of the first hot plug operation. As shown in FIG. 3, the record content of the first record file further includes the subdivision actions of the first hot plug operation such as OUT:<num>, IN:<num>, OUT:<num>HALF. OUT:<num> indicates that the execution unit 20 performs the first hot unplug operation on the hard disk with the hard disk identification num or the hot unplug operation (i.e., hot unplug record) on the hard disk with the hard disk identification num1 during the first hot transfer operation. IN:<num> indicates that the execution unit 20 performs the first hot insertion operation (i.e., hot insertion record) on the hard disk with the hard disk identification num or the hot insertion operation on the hard disk with the hard disk identification num1 during the first hot transfer operation. OUT:<num>HALF indicates that the execution unit 20 performs the first hot half unplug operation (i.e., hot half unplug record) on the hard disk with the hard disk identification num. For example, when the server 10 reads OUT:<1> in the first record file, it can be determined that during the testing of the first test case, the execution unit 20 completely removes the hard disk labeled as 1 from the first slot 12. The record content further includes the number of first hot plug operations such as the count record of the first hot unplug OUT<num>=b, the count record of the first hot insertion IN:<num>=a, and the count record of the hot half unplug OUT:<num>HALF=b.

At step S204, determining that the hard disk rack is not in the first preset state if the count record of the first hot insertion is less than the count record of the first hot unplug.

If the count record of the first hot insertion is less than the count record of the first hot unplug, a is less than b, it indicates that the hard disk with the hard disk identification num was not fully inserted into the first slot 12 by the execution unit 20, and the current state of the hard disk rack 40 is inconsistent with the first preset state.

In some embodiments, step S105 includes the following steps:

At step S301, determining that the spare hard disk rack is in the second preset state if the second record file does not have a spare hard disk identification.

Figure 4:
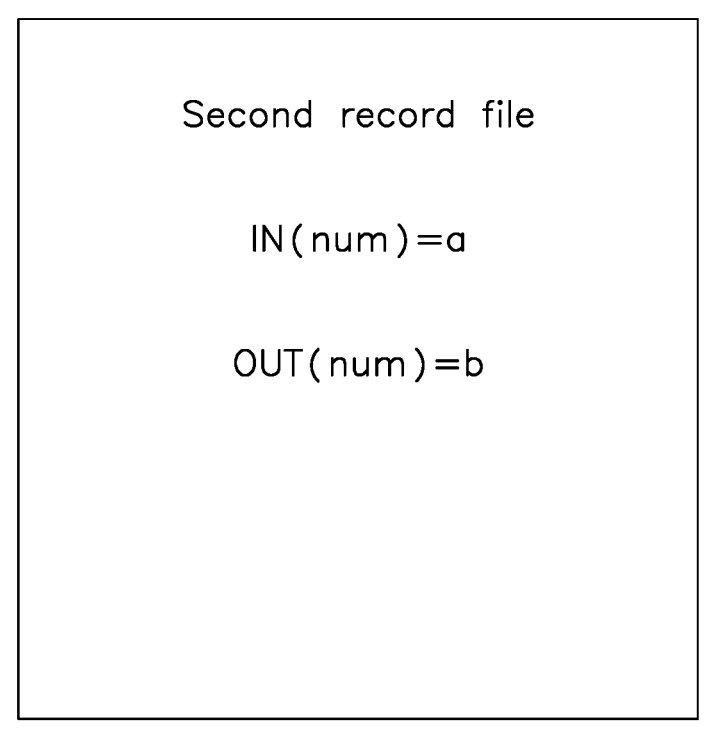

As shown in FIG. 4, the second record file includes the corresponding spare hard disk identification <num> of the hard disk that has undergone the first plug operation and the subdivision actions OUT:<num> and IN:<num> of the first plug operation. OUT:<num>indicates that the execution unit 20 unplugs out the hard disk with the spare hard disk identification num from the second slot 31, which is the first unplug operation (i.e., unplug record). IN:<num> indicates that the execution unit 20 inserts the hard disk with the spare hard disk identification <num> into the second slot 31, which is the first insertion operation (i.e., insertion record). For example, when the server 10 reads OUT:<5> in the second record file, it can be determined that execution unit 20 will completely remove the spare hard disk identification as <5> from the second slot 31.

When the second record file does not record the spare hard disk identification <num>, it indicates that the execution unit 20 has not yet performed the first plug operation on any second slot 31 of the spare hard disk rack 30, and the spare hard disk rack 30 is still in the second preset state.

At step S302, determining an initial state of the second slot corresponding to the spare hard disk identification and comparing the first unplug count record and first insert count record of the hard disk corresponding to the spare hard disk identification if the second record file is determined to have a spare hard disk identification.

The initial state of the second slot 31 refers to the corresponding state of the second slot 31 when the spare hard disk rack 30 is in the second preset state. The initial state of the second slot 31 includes inserting a hard disk or not inserting a hard disk. As shown in FIG. 4, the second record file further includes the first unplug count record OUT<num>=b and the first insertion count record IN:<num>=a. As shown in FIG. 1, the execution unit 20 performs a first insertion operations and b first unplug operations on the hard disk with the spare hard disk identification 1. The server 10 will record the first insertion count in the second record file as IN:<1>=a and the first unplug count in the second record file as OUT:<1>=b.

When the second record file records a spare hard disk identification <num>, it indicates that the execution unit 20 has performed a first plug operation on a hard disk in the second slot 31 of the spare hard disk rack 30, since the second preset state of the spare hard disk rack 30 is that the spare hard disk rack 30 has a preset number of the second slots 31 for inserting the hard disks. Thus, when the spare hard disk rack 30 is in the second preset state, the initial state of a second slot 31 on the spare hard disk rack 30 may or may not be plugged in the hard disk. Therefore, the present disclosure can determine whether the current spare hard disk rack 30 is in the second preset state by combining the first unplug count record, the first insertion count record, and the initial state of the second slot 31 corresponding to the spare hard disk identification.

In some embodiments, if the initial state of the second slot 31 is not be plugged in the hard disk, and the first insertion count record is less than or equal to the first unplug count record, or if the initial state of the second slot 31 is to insert a hard disk and the first insertion count record is greater than or equal to the first unplug count record, it is determined that the spare hard disk rack 30 is in the second preset state.

If the initial state of the second slot 31 is not be plugged in the hard disk, and a is less than or equal to b, it indicates that the current state of the second slot 31 is plugged in the hard disk, which is consistent with the initial state, and the spare hard disk rack 30 is in the second preset state. If the initial state of the second slot 31 is to insert a hard disk, and a is greater than or equal to b, it indicates that the current state of the second slot 31 is to insert a hard disk, which is consistent with the initial state, and the spare hard disk rack 30 is in the second preset state.

At step S303, determining that the spare hard disk rack is not in the second preset state if the initial state of the second slot corresponding to the spare hard disk identification is that no hard disk is plugged in, and the first insertion count record is greater than the first extraction count record or if the initial state of the second slot is to insert the hard disk, and the first insertion count record is less than the first unplug count record.

If the initial state of the second slot 31 is not be plugged in the hard disk, and a is greater than b, it indicates that the current state of the second slot 31 is plugged in the hard disk, which is not consistent with the initial state, and the spare hard disk rack 30 is not in the second preset state. If the initial state of the second slot 31 is to insert a hard disk, and a is less than b, it indicates that the current state of the second slot 31 is to insert a hard disk, which is not consistent with the initial state, and the spare hard disk rack 31 is not in the second preset state.

In some embodiments, step S106 includes the following steps:

At step S401, determining that the first slot corresponding to the hard disk identification on the server is a first executed slot based on a hot half unplug record without hard disk identification in the first record file if the hard disk rack is not in the first preset state and the spare hard disk rack is not in the second preset state.

The first executed slot can refer to the first slot 12 where the execution unit 20 performs operations. In step S204, it is determined that the current state of the first slot 12 corresponding to the hard disk identification num is inconsistent with the initial state, the reason for the inconsistency may be that the hard disk was ultimately completely unplugged or half unplugged. Therefore, it is necessary to further determine whether the hard disk corresponding to the hard disk identification num has a hot half unplug record OUT:<num>HALF. When the hard disk corresponding to the hard disk identification num does not have a hot half unplug record OUT:<num>HALF, it indicates that the hard disk has been completely unplugged, it is necessary to unplug one hard disk from the spare hard disk rack 30 and insert it into the first slot 12 corresponding to the hard disk identification num.

At step S402, determining that the hard disk corresponding to the spare hard disk identification on the spare hard disk rack is an executed hard disk, and determining the second slot corresponding to the spare hard disk identification is an executed second slot based on the first insertion count record of the spare hard disk identification in the second record file being greater than the first unplug count record.

The executed hard disk refers to the hard disk operated by the execution unit 20, the second executed slot refers to the second slot 31 where the execution unit 20 performs operations.

If a hard disk is unplugged from the spare hard disk rack 30 and the hard disk is inserted into the first slot 12 corresponding to the hard disk identification num, which hard disk is removed from the spare hard disk rack 30 should be considered. In one implementation, in step S303, the server 10 determines that the initial state of the second slot 31 corresponding to the spare hard disk identification num is not connected to the hard disk, and the first insertion count record corresponding to the spare hard disk identification num is greater than the first unplug count record. Therefore, it can be determined that the current state of the second slot 31 corresponding to the spare hard disk identification num is different from the initial state. That is, the hard disk of the second slot 31 needs to be unplugged.

At step S403, controlling the execution unit to perform a second unplug operation on the executed hard disk and a second hot insertion operation on the executed hard disk to unplug the executed hard disk from the second executed slot and insert the executed hard disk into the first executed slot.

The second hot plug operation can include the second hot insertion operation and the second hot half insertion operation. The second hot insertion operation refers to the operation of fully inserting the hard disk into the first slot 12, while the second hot half insertion operation refers to the operation of inserting the hard disk located halfway in the first slot 12 into the first slot 12.

The second plug operation may include a second unplug operation and a second insertion operation. The second unplug operation refers to pulling the hard disk out of the second slot 31 of the spare hard disk rack 30, and the second insertion operation refers to inserting the hard disk into the second slot 31 of the spare hard disk rack 30.

In one example, the server 10 determines that the first slot 12 corresponding to the hard disk identification <1> on the server is the first executed slot based on the fact that there is no hot half unplug record for the hard disk identification <1> in the record content. The server 10 determines that the hard disk with the spare hard disk identification <5> on the spare hard disk rack 30 is the executed hard disk based on the first insertion count record a greater than the first extraction count record b in the second record file, and determines that the corresponding second slot 31 with the spare hard disk identification <5> is the second executed slot. The server 10 issues a recovery instruction, and the execution unit 20 performs a second unplug operation, the driving device 21 drives the mechanical arm 22 to move to the second executed slot 31 with the spare hard disk identification <5>, the mechanical arm 22 extends to move the mechanical clamp 23 to a position where it can grab the executed hard disk with the spare hard disk identification <5>, the mechanical clamp 23 grabs the executed hard disk, and the mechanical arm 22 contracts. The mechanical clamp 23 will be completely pulled out of the second executed slot 31 on the spare hard disk. The execution unit 20 performs a second hot insertion operation, the driving device 21 drives the mechanical arm 22 to move to the first executed slot 12 of the hard disk identification <1> on the server 10. The mechanical arm 22 extends to move the mechanical clamp 23 to a position where the executed hard disk can be released, and the mechanical clamp 23 fully inserts the executed hard disk into the first executed slot 12.

In some embodiments, if the initial state of the second slot 31 is not storing the hard disk, and the first insertion count record is less than or equal to the first extraction count record, or if the initial state of the second slot 31 is a storage hard disk, and the first insertion count record is greater than or equal to the first unplug count record, the execution unit 20 is controlled to not perform a second plug operation on the second slot 31.

In some embodiments, step S106 further includes the following steps:

At step S501, not querying the second record file if the hard disk rack 40 is not in the first preset state and the spare hard disk rack is in the second preset state, determining that the first slot corresponding to the hard disk identification on the server is the first executed slot based on the hot plug record of the hard disk identification in the record content, and the hard disk corresponding to the hard disk identification is the executed hard disk.

After the completion of the first test case, it is possible that the hard disk rack 40 is not in the first preset state and the spare hard disk rack 30 is in the second preset state. The present disclosure can calculate the second hot plug operation required for the execution unit 20 based on the first record file. Specifically, in step S204, it is determined that the current state of the first slot 12 corresponding to the hard disk identification num was inconsistent with the initial state, the reason for the inconsistency may be that the hard disk of the first slot 12 was ultimately completely unplugged or half unplugged. Therefore, it is necessary to further determine whether the hard disk corresponding to the hard disk identification num has a hot half unplug record OUT: <num>HALF.

When the hard disk corresponding to the hard disk identification num has a hot half unplug record OUT: <num>HALF, it indicates that the hard disk has not been fully unplugged and is located in a partial position of the first slot 12, such as half.

At step S502, controlling the execution unit to perform a second hot half insertion operation on the executed hard disk located in the first executed slot to insert the executed hard disk into the first executed slot.

In one example, the server 10 determines that there is a half unplugged record OUT:<5>HALF, the first slot 12 corresponding to hard disk identification <5> is the first executed slot, and the hard disk corresponding to the hard disk identification <5> is the executed hard disk, the server 10 issues a recovery instruction, and the execution unit 20 receives the recovery instruction, and performs a second hot half insertion operation, the driving device 21 drives the mechanical arm 22 to move to the position of the hard disk with the hard disk identification <5>, the mechanical arm 22 extends to move the mechanical clamp 23 to a position where the hard disk can be grabbed. The mechanical clamp 23 grabs the hard disk with the hard disk identification <5> located halfway in the first slot 12 and fully inserts the hard disk into the first slot 12.

In some embodiments, step S106 further includes the following steps:

At step S601, not querying the first record file if the hard disk rack is in the first preset state and the spare hard disk rack is not in the second preset state, determining that the second slot corresponding to the first spare hard disk identification on the spare hard disk rack is the second executed slot based on the first insertion count record of the first spare hard disk identification is less than the first unplug count record of the first spare hard disk identification in the second record file, and the hard disk corresponding to the first spare hard disk identification is the executed hard disk.

The first spare hard disk identification refers to the spare hard disk identification of a certain hard disk in the second record file.

After the completion of the first test case, it is possible that the hard disk rack 40 is in the first preset state and the spare hard disk rack 30 is not in the second preset state. The present disclosure can calculate the second plug operation required for the execution unit 20 based on the second record file. Specifically, in step S303, the server 10 calculates that the current second slot 31 is plugged with a hard disk based on the initial state of the second slot 31 corresponding to the spare hard disk identification in the second record file as not plugged with a hard disk, and that the first insertion count record is greater than the first unplug count record, which is not the same as the initial state, and that the second slot 31 needs to be unplugged from the hard disk.

At step S602, determining that the second slot corresponding to the second spare hard disk identification is the second executed slot based on the fact that the first insertion count record of the second spare hard disk identification is greater than the first unplug count record of the second spare hard disk identification in the second record file.

The second spare hard disk identification is the spare hard disk identification of the other hard disk in the second record file.

In step S303, the server 10 calculates that the current second slot 31 is not plugged with a hard disk based on the initial state of the second slot 31 corresponding to the spare hard disk identification in the second record file as not plugged with a hard disk, and that the first insertion count record is less than the first unplug count record, which is not the same as the initial state, and that the second slot 31 needs to be unplugged from the hard disk.

At step S603, controlling the execution unit to perform a second unplug operation on the executed hard disk located in the second executed slot corresponding to the first spare hard disk identification, and perform a second insertion operation on the executed hard disk to pull the executed hard disk from the second executed slot corresponding to the first spare hard disk identification and insert the executed hard disk into the second executed slot corresponding to the second spare hard disk identification.

In one example, the server 10 determines that the second executed slot 31 corresponding to the first spare hard disk identification <4> on the spare hard disk rack 30 is the second executed slot based on the first insertion count record a in the second record file being less than the first unplug count record b in the second record file, and the first spare hard disk identification <4> corresponds to the executed hard disk. The server 10 determines that the second executed slot 31 corresponding to the second spare hard disk identification <6> is the second executed slot based on the first insertion count record a of the second spare hard disk identification <6> being less than the first unplug count record b second spare hard disk identification <6>. The server 10 issues a recovery instruction, and the execution unit 20 performs a second unplug operation, the driving device 21 drives the mechanical arm 22 to move to the second executed slot 31 with the first spare hard disk identification <4>, the mechanical arm 22 extends to move the mechanical clamp 23 to a position where it can grab the executed hard disk with the first spare hard disk identification <4>, the mechanical clamp 23 grabs the executed hard disk, and the mechanical arm 22 contracts. The mechanical clamp 23 will be completely pulled out of the second executed slot 31 corresponding to the first spare hard disk identification <4>. The execution unit 20 performs a second hot insertion operation, the driving device 21 drives the mechanical arm 22 to move to the second executed slot 31 corresponding to the second spare hard disk identification <6>. The mechanical arm 22 extends to move the mechanical clamp 23 to a position where the executed hard disk can be released, and the mechanical clamp 23 fully inserts the executed hard disk into the second executed slot 31 corresponding to the second spare hard disk identification <6>.

Although there are a preset number of the second slots 31 on the spare hard disk rack 30 to plug in the hard disk, for a second slot 31, it may not be consistent with the initial state. Therefore, through the second plug operation, the current state of each second slot 31 can be restored to the initial state.

In some embodiments, step S106 further includes the following steps:

At step S701, detecting presence information of the hard disk of the hard disk rack.

After restoring the hard disk rack 40 to the first preset state and the spare hard disk rack 30 to the second preset state, the presence information of the hard disk of the first slot 12 on the hard disk rack 40 can be detected again using a detection tool. For example, the detection tool includes an Odyssey tool under the Linux operating system, and server 10 uses the Odyssey tool to detect the presence information of the hard disk in the first slot 12. When the presence information of the first slot 12 is 1, it can be determined that the first slot 12 is plugged with a hard disk. When the presence information is 0, it can be determined that the first slot 12 is not plugged with a hard disk.

At step S702, determining that the hard disk rack is restored to the first preset state and the spare hard disk rack is restored to the second preset state if the presence information of the hard disk is existed in the first slot of the hard disk rack.

At step S703, controlling the execution unit to restore the hard disk rack to the first preset state and the spare hard disk rack to the second preset state if the presence information of the hard disk is not existed in the first slot of the hard disk rack.

In some embodiments, after step S106, the hard disk pluggable method further includes the following steps:

At step S801, clearing the first record file.

At step S802, clearing the second record file.

The present disclosure clears the record contents of the first record file and the second record file, in order to re-record the first hot plug operation performed by the execution unit 20 on the hard disk rack 40 and the first plug operation performed by the execution unit 20 on the spare hard disk rack 30 for the next test case test.

In some embodiments, after steps S801 and S802, step S107 includes:

At step S901, the execution unit performs the third hot plug operation on the hard disk of the hard disk rack when using the first record file to record the server testing the second test case.

At step S902, the execution unit performs the third hot plug operation on the hard disk of the spare hard disk rack when using the second record file to record the server testing the second test case.

After the contents of the first record file and the second record file are cleared, the first record file and the second record file will continue to record the third hot plug operation and the third plug operation of the second test case, respectively. The server 10, in combination with the contents of the first record file and the second record file, can analyze the real-time trajectory and current state of the hard disk during the second test case. For example, the real-time trajectory refers to the trajectory of the hard disk moving from the first slot 12 of number 1 to the second slot 31 of number 5. The current state can be that the hard disk with identification 1 is fully inserted into the first slot 12 of number 1.

The present disclosure can combine the first record file and the second record file to record the content in real-time and provide subsequent operation guidance for the next plug operation or hot plug operation of the hard disk during the test case process. The server 10 can control the execution unit 20 to perform a second hot plug operation on the hard disk 41 of the hard disk rack 40 and a second plug operation on the hard disk 42 of the spare hard disk rack 30 based on the first record file and the second record file.

At step S903, changing the third hot plug operation based on the first record file.

The server 10 generates a plurality of control instructions based on the test contents of the first test case (in this embodiment, the second test case), these control instructions are generated based on the second test case without regard to the state of the first slot 12 of the server 10 and the second slot 31 of the spare hard disk rack 30. As a result, there may be a conflict between the control instructions and the state of the server 10 or the spare hard disk rack 30. For example, the server 10 issues an IN:<2>NEW instruction to the execution unit 20, and the execution unit 20 needs to move to the spare hard disk rack 30 to grab a hard disk and insert the hard disk into the first slot 12 corresponding to the hard disk identification 2. However, there is a hard disk half inserted in the first slot 12. The IN:<2>NEW instruction of the server 10 conflicts with the current state of the first slot 12 corresponding to hard disk identification 2.

Therefore, the server 10 can calculate the current state of each first slot 12 of the server 10 based on the content of the first record file. When a conflict is found between the current state of the first slot 12 and the control instructions of the server 10, the server 10 may correct the control instructions, i.e., change the third hot plug operation according to the first record file, and the operation of the execution unit 20 conforms to the real condition of the server 10.

At step S904, determining a target slot of the spare hard disk rack based on the second record file.

When the execution unit 20 performs a third hot insertion operation or a third hot unplug operation on the server 10, a hard disk needs to be pulled out or a hard disk needs to be inserted from the second slot 31 of the spare hard disk rack 30. Therefore, the second slot 31 (i.e., the target slot) for pulling out or inserting a hard disk needs to be found. Similarly, the server 10 may calculate the current state of each of the second slots 31 of the spare disk rack 30 based on the contents of the second record file.

After the server 10 determines the target slot by means of the second record file, the control instruction may save the step of designating a particular second slot 31 as the object of operation.

At step S905, controlling the execution unit to perform a third hot plug operation and a changed third hot plug operation on the hard disk in the first slot of the hard disk rack, and to perform a third plug operation on the hard disk in the second slot and the target slot to complete the second test case.

There are control instructions that do not need to be changed, so that the execution unit 20 performs a third hot plug operation and a changed third hot plug operation on the hard disk 41 in the first slot 12 of the hard disk rack 40, and performs a third plug operation on the hard disk 42 in the second slot 31 and the target slot to complete the second test case, and the second test case can be completed.

In some embodiments, step S903 includes the following steps:

At step S1001, determining a third hot insertion operation of a hard disk with a hard disk identification according to the second test case.

The specific action of the third hot plug operation is referred to the first hot plug operation, and the specific action of the third plug operation is referred to the first plug operation. The third hot plug operation includes the third hot plug operation, the third hot plug operation, the third hot half plug operation, the third hot half plug operation, and the third hot plug operation. The third hot plug operation includes the third unplug operation and the third insertion operation.

The server 10 can generate control instruction IN:<num> based on the second test case, and the execution unit 20 receives IN:<num> before executing the third hot insertion operation.

At step S1002, changing the third hot insertion operation to the third hot half insertion operation based on the current hot half insertion record of the hard disk identification of the first record file.

If the first record file records that the first slot 12 corresponding to the hard disk identification has a current hot half unplug record, it indicates that the first slot 12 has just been subjected to a third hot half unplug operation and that the first slot 12 has a hard disk located in one half of it. Thus, the third hot insertion operation corresponding to the control instruction conflicts with the current state of the first slot 12. The server 10 changes the third hot insertion operation to a third hot half insertion operation, and the execution unit 20 performs a third hot plug operation to fully insert the hard disk into the first slot 12.

In some embodiments, step S903 includes the following steps:

At step S1101, determining a third hot unplug operation of the hard disk corresponding to the hard disk identification according to the second test case.

The server 10 may generate the control instruction OUT:<num> according to the second test case, and the execution unit 20 receives OUT:<num> and performs the third hot unplug operation.

At step S1102, not performing a third hot unplug operation based on the current hot unplug record of the hard disk identification of the first record file.

If the first record file records that the first slot 12 corresponding to the hard disk identification has a current hot unplug record, it indicates that the first slot 12 has just been subjected to a third hot unplug operation and there are no hard disks in the first slot 12. Thus, the third hot unplug operation corresponding to the control instruction conflicts with the current state of the first slot 12. The server 10 changes the third hot unplug operation to not perform the third hot half plug operation, and the execution unit 20 does not perform the third hot unplug operation to conform to the state in which the first slot 12 does not have a hard disk.

In some embodiments, step S904 includes the following steps:

At step S1201, determining the second slot corresponding to the current unplug record is the target slot based on the current unplug record of the second record file.

If the second slot 31 corresponding to the spare hard disk identification of the second record file has a current unplug record, it indicates that the second slot 31 has just been subjected to a third unplug operation and no hard disk exists in this second slot 31. Therefore, the second slot 31 is determined to be a target slot for inserting a hard disk from the first slot 12.

At step S1202, determining that the second slot corresponding to the current insertion record is the target slot based on the current insertion record of the second record file.

If the second slot 31 corresponding to the spare hard disk identification of the second record file has a current insertion record, it indicates that the second slot 31 has just been subjected to a third insertion operation and n hard disk exists in this second slot 31. Therefore, the second slot 31 is determined to be a target slot for inserting a hard disk from the first slot 12.

In one example, the server 10 generates the control instructions based on the corresponding program of the redundancy characteristic test case. After receiving the control instructions, the execution unit 20 executes the third hot unplug operation of the test case for testing redundancy characteristics. The server 10 changes the third hot unplug operation to the third hot half unplug operation based on the first record file, and determines the target slot of the spare hard disk rack based on the second record file. The driving device 21 drives the mechanical arm 22 to move to the first slot 31 of the hard disk rack 40, the mechanical arm 22 extends to move the mechanical clamp 23 to a position where it can grab the hard disk located halfway through the first slot 12, the mechanical clamp 23 grabs the hard disk, and the mechanical arm 22 contracts. The execution unit 20 performs a third hot insertion operation of test cases for testing redundancy characteristics, the driving device 21 drives the mechanical arm 22 to move to the second executed slot 31 of the spare hard disk rack 30. The mechanical arm 22 extends to move the mechanical clamp 23 to a position where the hard disk can be released, and the mechanical clamp 23 releases the hard disk. By analogy, the third hot plug operation and the third plug operation required to complete the test case for redundancy characteristics are required.

The embodiment of the present disclosure further provides a hard disk pluggable system 100. The hard disk pluggable system 100 includes a server 10, an execution unit 20, and a spare hard disk rack 30. The server 10 includes a backplane 11 and a hard disk rack 40, and the server 10 performs the hot plug operation on the hard disk 41 of the hard disk rack 40 through the execution unit 20 or performs the plug operation on the hard disk 42 of the spare hard disk rack 30.

The server 10 is used for:
creating the first record file and the second record file;
controlling the execution unit 20 to perform a first hot plug operation on the hard disk of the hard disk rack 40 when using the first record file to record the server 10 testing the first test case;
controlling the execution unit 20 to perform a first plug operation on the hard disk of the hard disk rack 30 when using the second record file to record the server 10 testing the first test case;
determining whether the hard disk rack 40 is in the first preset state based on the first record file;
determining whether the hard disk rack 30 is in the second preset state based on the second record file;
controlling the execution unit 20 to perform a second hot plug operation on the hard disk 41 of the hard disk rack 40 and a second plug operation on the hard disk 42 of the spare hard disk rack 30 based on the first record file and the second record file if the hard disk rack 40 is not in the first preset state and the spare hard disk rack 30 is not in the second preset state;
controlling the execution unit 20 to perform a third hot plug operation on the hard disk 41 of the hard disk rack 40 and a third plug operation on the hard disk 42 of the spare hard disk rack 30 according to a second test case if the hard disk rack 40 is in the first preset state and the spare hard disk rack 30 is in the second preset state.

In some embodiments, the server 10 is further used to perform steps S201 to S204, steps S301 to S303, steps S401 to S403, steps S501 to S502, steps S601 to S603, steps S701 to S703, steps S801 to S802, steps S901 to S905, steps S1001 to S1002, and steps S1101 to S1102.

Figure 5:
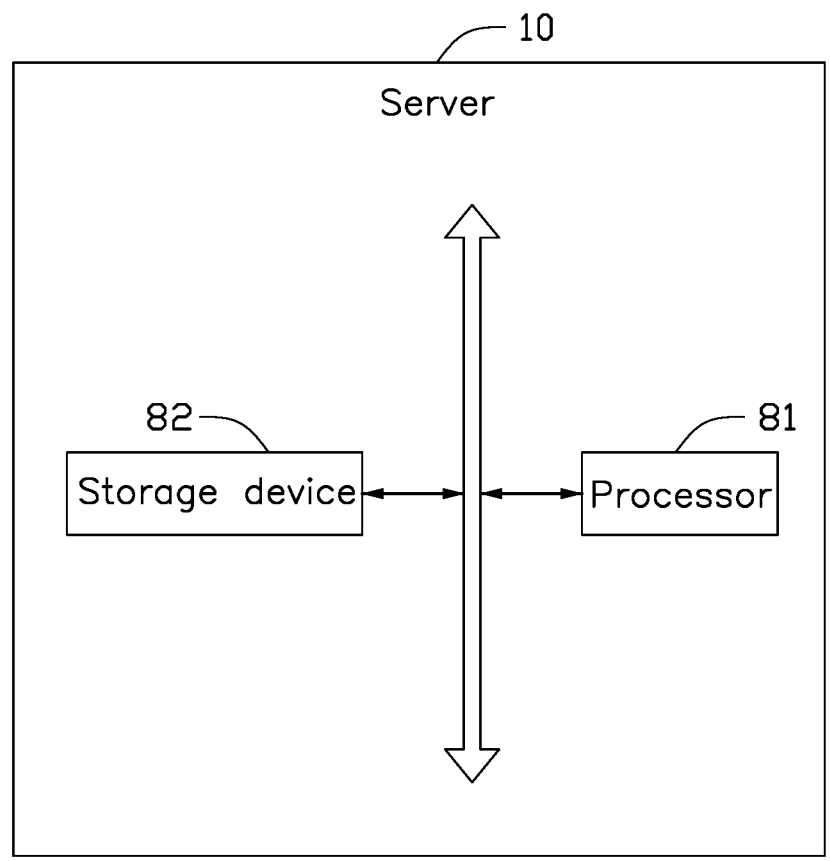
FIG. 5 is a schematic diagram of a server according to an embodiment of the present disclosure.

Those skilled in the art should understand that the structure of the server 10 shown in FIG. 5 does not constitute a limitation of the present disclosure. The server 10 may also include, more or less, other hard drives or software, or different component arrangements than shown in the figure.

In one embodiment, the server 10 includes a terminal capable of automatically performing numerical calculations and/or information processing according to pre-set or stored instructions, and its hard disk includes but is not limited to microprocessors, specialized integrated circuits, programmable gate arrays, digital processors, and embedded devices. The storage device 82 is used to store program code and various data. The storage device 82 can include read only memory (ROM), random access memory (RAM), programmable read only memory (PROM), erasable programmable read only memory (EPROM), one time programmable read only memory (OTPROM), electrically erasable programmable read only memory (EEPROM), compact disc read only memory (CD-ROM), or other optical disk storage, disk storage, magnetic tape storage, or any other computer-readable medium capable of carrying or storing data.

At least one processor 81 may include integrated circuits, such as a single packaged integrated circuit, or multiple integrated circuits with the same or different functional packages, including microprocessors, digital processing chips, image processors, and combinations of various control chips. At least one processor 81 is the control unit of the control terminal, which runs or executes programs or modules stored in the storage device 82, and calls data stored in the storage device 82 to perform various functions of the server 10 and process data. The integrated unit implemented in the form of software functional modules mentioned above can be stored in a computer readable storage medium. The above software functional modules are stored in a storage medium, including several instructions to enable a computer device (which can be a personal computer, terminal, or network device, etc.) or processor to execute portions of the various embodiments of the present application. The storage device 82 stores program code, and at least one processor 81 can call the program code stored in the storage device 82 to perform related functions. In an embodiment of the present disclosure, the storage device 82 stores multiple instructions, which are executed by at least one processor 81 to achieve the hard disk pluggable method. Specifically, the specific implementation method of the above instructions by at least one processor 81 corresponds to the description of the relevant steps in the implementation example, which will not be repeated here.

The embodiment of the present disclosure further provides a storage medium. The computer instructions are stored in the storage medium, and when the computer instructions run on a computing device, the computing device can execute the hard disk pluggable method of the server 10.

Those of ordinary skill in the art should realize that the above embodiments are only used to illustrate the present disclosure, but not to limit the present disclosure. As long as they are within the essential spirit of the present disclosure, the above embodiments are appropriately made and changes fall within the scope of protection of the present disclosure.

What is claimed is:

1. A hard disk pluggable method applied in a server, the server comprising a hard disk rack, the server configured for performing hot plug operations on a plurality of first hard disks on the hard disk rack or performing plug operations a plurality of second hard disks on a spare hard disk rack through an execution unit, the hard disk pluggable method comprising:
    creating a first record file and a second record file;
    controlling the execution unit to perform a first hot plug operation on the plurality of first hard disks on the hard disk rack when using the first record file to record the server testing a first test case;
    controlling the execution unit to perform a first plug operation on the plurality of second hard disks on the spare hard disk rack when using the second record file to record the server testing the first test case;
    determining whether the hard disk rack is in a first preset state based on the first record file;
    determining whether the spare hard disk rack is in a second preset state based on the second record file;
    controlling the execution unit to perform a second hot plug operation on the plurality of first hard disks on the hard disk rack and a second plug operation on the plurality of second hard disks on the spare hard disk rack based on the first record file and the second record file to restore the hard disk rack to the first preset state and the spare hard disk rack to the second preset state if the hard disk rack is not in the first preset state and the spare hard disk rack is not in the second preset state; and
    controlling the execution unit to perform a third hot plug operation on the plurality of first hard disks on the hard disk rack and a third plug operation on the plurality of second hard disks of the spare hard disk rack according to a second test case if the hard disk rack is in the first preset state and the spare hard disk rack is in the second preset state.

2. The hard disk pluggable method of claim 1, wherein after restoring the hard disk rack to the first preset state and the spare hard drive rack to the second preset state, further comprises:
    clearing the first record file; and
    clearing the second record file.

3. The hard disk pluggable method of claim 2, wherein after clearing the first record file and the second record file, controlling the execution unit to perform the third hot plug operation on the plurality of first hard disks on the hard disk rack and the third plug operation on the plurality of second hard disks on the spare hard disk rack according to the second test case, further comprises:
    controlling the execution unit to perform the third hot plug operation on the plurality of first hard disks on the hard disk rack when using the first record file to record the server testing the second test case;
    controlling the execution unit to perform the third plug operation on the plurality of second hard disks of the spare hard disk rack when using the second record file to record the server testing the second test case;
    changing the third hot plug operation based on the first record file;
    determining a target slot of the spare hard disk rack based on the second record file; and
    controlling the execution unit to perform the third hot plug operation and the changed third hot plug operation on a first hard disk in a first slot of the hard disk rack and performing the third plug operation on a second hard disk in the target slot to complete testing of the second test case.

4. The hard disk pluggable method of claim 3, wherein the third hot plug operation comprises a hot insertion operation, a hot half insertion operation, a hot unplug operation, and a hot half unplug operation, wherein changing the third hot plug operation based on the first record file, further comprises:
  determining the hot insertion operation of the first hard disk corresponding to a hard disk identification based on the second test case;
  changing the hot insertion operation to the hot half insertion operation based on a current hot half insertion record of a hard disk identification in the first record file;
  determining the hot unplug operation of the first hard disk corresponding to the hard disk identification based on the second test case;
  not performing the hot unplug operation based on a current hot unplug record of the hard disk identification in the first record file, and
  wherein determining the target slot of the spare hard disk rack based on the second record file, further comprises:
  determining that a second slot corresponding to a current unplug record is the target slot based on the current unplug record of the second record file; and
  determining that the second slot corresponding to a current insertion record is the target slot based on the current insertion record of the second record file.

5. The hard disk pluggable method of claim 1,
wherein determining whether the hard disk rack is in the first preset state based on the first record file, further comprises:
  determining that the hard disk rack is in the first preset state if the first record file does not have a hard disk identification;
  comparing a first hot unplug count record corresponding to the hard disk identification and a first hot insertion count record corresponding to the hard disk identification if the first record file has the hard disk identification; and
  determining that the hard disk rack is not in the first preset state if the first hot insertion count record is less than the first hot unplug count record, and
  wherein determining whether the spare hard disk rack is in the second preset state based on the second record file, further comprises:
  determining that the spare hard disk rack is in the second preset state if the second record file does not have a spare hard disk identification;
  determining an initial state of a second slot corresponding to the spare hard disk identification and comparing the first unplug count record and the first insertion count record of the hard disk corresponding to the spare hard disk identification if the second record file has the spare hard disk identification; and
  determining that the spare hard disk rack is not in the second preset state if the initial state of the second slot corresponding to the spare hard disk identification is that there is no second hard disk inserted to the spare hard disk rack and the first insertion count record is greater than the first unplug count record, or if the initial state of the second slot corresponding to the spare hard disk identification is that there is a second hard disk inserted to the spare hard disk rack and the first insertion count record is less than the first unplug count record.

6. The hard disk pluggable method of claim 1, wherein controlling the execution unit to perform the second hot plug operation on the plurality of first hard disks on the hard disk rack and the second plug operation on the plurality of second hard disks on the spare hard disk rack based on the first record file and the second record file to restore the hard disk rack to the first preset state and the spare hard disk rack to the second preset state if the hard disk rack is not in the first preset state and the spare hard disk rack is not in the second preset state, further comprises:
  determining that a first slot corresponding to a hard disk identification on the server is a first executed slot based on a hot plug record without the hard disk identification in the first record file;
  determining that the second hard disk corresponding to a spare hard disk identification on the spare hard disk rack is an executed hard disk, and a second slot corresponding to the spare hard disk identification is a second executed slot based on a first insertion count record of the spare hard disk identification being greater than a first unplug count record of the spare hard disk identification in the second record file; and
  controlling the execution unit to perform an unplug operation on the executed hard disk to pull the executed hard disk out of the second executed slot, and perform a second hot insertion operation on the executed hard disk to insert the executed hard disk into the first executed slot.

7. The hard disk pluggable method of claim 1, wherein after the execution unit restores the hard disk rack to the first preset state and the spare hard disk rack to the second preset state, the hard disk pluggable method further comprises:
  detecting presence information of a first hard disk on the hard disk rack;
  determining that the hard disk rack is restored to the first preset state and the spare hard disk rack is restored to the second preset state if a first slot of the hard disk rack exists the presence information of the first hard disk; and
  controlling the execution unit to restore the hard disk rack to the first preset state and the spare hard disk rack to the second preset state if the first slot of the hard disk rack does not exist the presence information of the first hard disk.

8. A server comprising:
  a storage device; and
  at least one processor, wherein the storage device stores one or more programs, when executed by the at least one processor, the one or more programs cause the at least one processor to:
  create a first record file and a second record file;
  control the execution unit to perform a first hot plug operation on a plurality of first hard disks on a hard disk rack when using the first record file to record the server testing a first test case;
  control the execution unit to perform a first plug operation on a plurality of second hard disks on a spare hard disk rack when using the second record file to record the server testing the first test case;
  determine whether the hard disk rack is in a first preset state based on the first record file;
  determine whether the spare hard disk rack is in a second preset state based on the second record file;
  control the execution unit to perform a second hot plug operation on the plurality of first hard disks of the hard disk rack and a second plug operation on the plurality of second hard disks of the spare hard disk rack based on the first record file and the second record file to restore the hard disk rack to the first preset state and the spare hard disk rack to the second preset state if the hard disk rack is not in the first preset state and the spare hard disk rack is not in the second preset state; and control the execution unit to perform a third hot plug operation on the plurality of first hard disks on the hard disk rack and a third plug operation on the plurality of second hard disks on the spare hard disk rack according to a second test case if the hard disk rack is in the first preset state and the spare hard disk rack is in the second preset state.

9. The server of claim 8, wherein after the hard disk rack is restored to the first preset state and the spare hard drive rack is restored to the second preset state, the at least one processor is further caused to:

clear the first record file; and clear the second record file.

10. The server of claim 9, wherein the at least one processor is further caused to:

control the execution unit to perform the third hot plug operation on the plurality of first hard disks on the hard disk rack when using the first record file to record the server testing the second test case;

control the execution unit to perform the third plug operation on the plurality of second hard disks on the spare hard disk rack when using the second record file to record the server testing the second test case;

change the third hot plug operation based on the first record file;

determine a target slot of the spare hard disk rack based on the second record file; and control the execution unit to perform the third hot plug operation and the changed third hot plug operation on a first hard disk in a first slot of the hard disk rack and perform the third plug operation on a second hard disk in the target slot to complete testing of the second test case.

11. The server of claim 10, wherein the third hot plug operation comprises a hot insertion operation, a hot half insertion operation, a hot unplug operation, and a hot half unplug operation, the at least one processor is further caused to:

determine the hot insertion operation of the first hard disk corresponding to a hard disk identification based on the second test case;

change the hot insertion operation to the hot half insertion operation based on a current hot half insertion record of a hard disk identification in the first record file;

determine the hot unplug operation of the first hard disk corresponding to the hard disk identification based on the second test case;

not perform the hot unplug operation based on a current hot unplug record of the hard disk identification in the first record file, and determine that a second slot corresponding to a current unplug record is the target slot based on the current unplug record of the second record file; and determine that the second slot corresponding to a current insertion record is the target slot based on the current insertion record of the second record file.

12. The server of claim 8, wherein the at least one processor is further caused to:

determine that the hard disk rack is in the first preset state if the first record file does not have a hard disk identification;

compare a first hot unplug count record corresponding to the hard disk identification and a first hot insertion count record corresponding to the hard disk identification if the first record file has the hard disk identification; and determine that the hard disk rack is not in the first preset state if the first hot insertion count record is less than the first hot unplug count record, and determine that the spare hard disk rack is in the second preset state if the second record file does not have a spare hard disk identification;

determine an initial state of a second slot corresponding to the spare hard disk identification and compare the first unplug count record and the first insertion count record of the hard disk corresponding to the spare hard disk identification if the second record file has the spare hard disk identification; and determine that the spare hard disk rack is not in the second preset state if the initial state of the second slot corresponding to the spare hard disk identification is that there is no second hard disk inserted to the spare hard disk rack, and the first insertion count record is greater than the first unplug count record, or if the initial state of the second slot corresponding to the spare hard disk identification is that there is a second hard disk inserted to the spare hard disk rack, and the first insertion count record is less than the first unplug count record.

13. The server of claim 8, wherein the at least one processor is further caused to:

determine that a first slot corresponding to a hard disk identification on the server is a first executed slot based on a hot plug record without the hard disk identification in the first record file;

determine that the second hard disk corresponding to a spare hard disk identification on the spare hard disk rack is an executed hard disk, and a second slot corresponding to the spare hard disk identification is a second executed slot based on a first insertion count record of the spare hard disk identification being greater than a first unplug count record of the spare hard disk identification in the second record file; and control the execution unit to perform a second unplug operation on the executed hard disk to pull the executed hard disk out of the second executed slot, and perform a second hot insertion operation on the executed hard disk to insert the executed hard disk into the first executed slot.

14. The server of claim 8, wherein the at least one processor is further caused to:

detect presence information of a first hard disk on the hard disk rack;

determine that the hard disk rack is restored to the first preset state and the spare hard disk rack is restored to the second preset state if a first slot of the hard disk rack exists the presence information of the first hard disk; and control the execution unit to restore the hard disk rack to the first preset state and the spare hard disk rack to the second preset state if the first slot of the hard disk rack does not exist the presence information of the hard disk.

15. A hard disk pluggable system comprising:

an execution unit, a spare hard disk rack, and a server comprising a hard disk rack, the server configured to perform hot plug operations on a plurality of first hard disks of the hard disk rack or a plurality of second hard disks of the spare hard disk rack through the execution unit, the server further configured to:

create a first record file and a second record file;

control the execution unit to perform a first hot plug operation on a plurality of first hard disks on the hard disk rack when using the first record file to record the server testing a first test case;

control the execution unit to perform a first plug operation on a plurality of second hard disks on a spare hard disk rack when using the second record file to record the server testing the first test case;

determine whether the hard disk rack is in a first preset state based on the first record file;

determine whether the spare hard disk rack is in a second preset state based on the second record file;

control the execution unit to perform a second hot plug operation on the plurality of first hard disks of the hard disk rack and a second plug operation on the plurality of second hard disks of the spare hard disk rack based on the first record file and the second record file to restore the hard disk rack to the first preset state and the spare hard disk rack to the second preset state if the hard disk rack is not in the first preset state and the spare hard disk rack is not in the second preset state; and control the execution unit to perform a third hot plug operation on the plurality of first hard disks on the hard disk rack and a third plug operation on the plurality of second hard disks on the spare hard disk rack according to a second test case if the hard disk rack is in the first preset state and the spare hard disk rack is in the second preset state.

16. The hard disk pluggable system of claim 15, wherein after the hard disk rack is restored to the first preset state and the spare hard drive rack is restored to the second preset state, the server is further configured to:

clear the first record file; and clear the second record file.

17. The hard disk pluggable system of claim 16, wherein the server is further configured to:

control the execution unit to perform a third hot plug operation on the first hard disks of the hard disk rack when using the first record file to record the server testing the second test case;

control the execution unit to perform a third plug operation on the hard disks of the hard disk rack when using the second record file to record the server testing the second test case;

change the third hot plug operation based on the first record file;

determine a target slot of the spare hard disk rack based on the second record file; and control the execution unit to perform the third hot plug operation and changed third hot plug operation on the first hard disk in a first slot of the hard disk rack and perform the third plug operation on the hard disk in the target slot to complete testing of the second test case.

18. The hard disk pluggable system of claim 17, wherein the third hot plug operation comprises a third hot insertion operation, a third hot half insertion operation, a third hot unplug operation, and a third hot half unplug operation, the server is further caused to:

determine the third hot insertion operation of the hard disk corresponding to a hard disk identification based on the second test case;

change the third hot insertion operation to the third hot half insertion operation based on current hot half insertion record of the hard disk identification in the first record file;

determine the third hot unplug operation of the hard disk corresponding to the hard disk identification based on the second test case;

not perform the third hot unplug operation based on a current hot unplug record of the hard disk identification in the first record file;

determine that a second slot corresponding to a current unplug record is the target slot based on the current unplug record of the second record file; and determine that the second slot corresponding to a current insertion record is the target slot based on the current insertion record of the second record file.

19. The hard disk pluggable system of claim 15, wherein the server is further configured to:

determine that the hard disk rack is in the first preset state if the first record file does not have a hard disk identification;

compare a first hot unplug count record corresponding to the hard disk identification and a first hot insertion count record corresponding to the hard disk identification if the first record file has a hard disk identification; and determine that the hard disk rack is not in the first preset state if the first hot insertion count record is less than the first hot unplug count record;

determine that the spare hard disk rack is in the second preset state if it is determined that the second record file does not have a spare hard disk identification;

determine an initial state of the second slot corresponding to the spare hard disk identification and compare the first unplug count record and the first insertion count record of the hard disk corresponding to a spare hard disk identification if the second record file has the spare hard disk identification; and determine that the spare hard disk rack is not in the second preset state if the initial state of the second slot corresponding to the spare hard disk identification is that there is no inserted hard disk, and the first insertion count record is greater than the first unplug count record, or if the initial state of the second slot corresponding to the spare hard disk identification is to insert the hard disk, and the first insertion count record is less than the first unplug count record.

20. The hard disk pluggable system of claim 15, wherein the server is further configured to:

determine that the first slot corresponding to the hard disk identification on the server is a first executed slot based on a hot plug record without a hard disk identification in the first record file;

determine that the hard disk corresponding to a spare hard disk identification on the spare hard disk rack is an executed hard disk, and the second slot corresponding to the spare hard disk identification is a second executed slot based on the first insertion count record of the spare hard disk identification being greater than the first unplug count record of the spare hard disk identification in the second record file; and control the execution unit to perform a second unplug operation on the executed hard disk and performing a second hot insertion operation on the executed hard disk to pull the executed hard disk out of the second executed slot and insert the executed hard disk into the first executed slot.

* * * * *